(Model.)

W. E. STEVENS.
SPECTACLE OR EYEGLASS FRAME.

No. 495,918. Patented Apr. 18, 1893.

Witnesses  
Oscar A. Michel  
Wm Breitenbach

Inventor  
William E. Stevens,  
By Drake & Co. Atty's.

UNITED STATES PATENT OFFICE.

WILLIAM E. STEVENS, OF NEWARK, NEW JERSEY.

SPECTACLE OR EYEGLASS FRAME.

SPECIFICATION forming part of Letters Patent No. 495,918, dated April 18, 1893.

Application filed February 27, 1892. Serial No. 422,980. (Model.)

*To all whom it may concern:*

Be it known that I, WILLIAM E. STEVENS, a citizen of the United States, residing at Newark, in the county of Essex and State of New Jersey, have invented certain new and useful Improvements in Spectacle or Eyeglass Frames; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to secure a stronger and more durable frame for the eye glasses or lenses, to reduce the cost of construction, to provide a more sightly or better finished article, and to secure other advantages and results some of which will be referred to in connection with the description of the working parts.

The invention consists in the improved spectacles or eye-glasses and in the arrangements and combinations of parts of the same, substantially as will be hereinafter set forth and finally embodied in the clauses of the claim.

Figure 1:
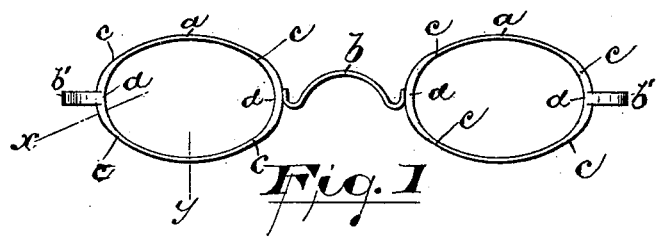
Figure 2:
Figure 3:

Referring to the accompanying drawings in which like letters indicate corresponding parts in each of the views, Figure 1 is an elevation of an eye-glass or spectacles embodying my invention, and Figs. 2 and 3 are sections of the frame for one of the lenses or glasses taken on lines $x$ and $y$, respectively.

In said drawings, $a, a$, are two eye-wires, which are preferably of the usual oval shape and are interiorly grooved to hold or contain the lenses in the usual manner. They are connected at their inner ends by the nose wire, $b$, and at their opposite or outer ends, receive the end pieces $b', b'$, which may be the ordinary "temples," or in eye glasses, the handle and other usual connections. The ends of said eye-wires have frequently been reinforced where said attachments or connections have had their bearings. For example, see Patent No. 437,396, the reinforcing piece being attached by solder. At the points where the reinforcing pieces terminated, shoulders have been formed, at which the said eye wires were apt to break in fitting the eye-glasses into place, because of the stretching operation to which the wire was ordinarily subjected. In the present case, the reinforced eye wires or frames for the lenses are of one integral piece and are made as indicated in Fig. 1 where the ends are increased in thickness in the direction or plane of the eye wires, as at $d, d$, to receive the attachments and provide a substantial and strong bearing for the same, and gradually taper off, as at $c, c$, toward the upper and lower sides where the wires are of ordinary thickness.

In addition to the mechanical advantages secured by the construction thus described, the objectionable shoulders are avoided and the spectacles or eye glass presents a neater and more finished appearance.

Having thus described the invention, what I claim as new is—

1. The improved eye-glass or spectacles herein described having the eye wire, $a$, interiorly grooved to receive the lens and thickened integrally at its end bearings to receive the nose wire and similar attachments, substantially as and for the purposes set forth.

2. The improved eye glass or spectacles herein described having the oval eye-wires, $a$, with lens grooves and an integral reinforcement at the end bearings which reinforcement is in the direction or plane of the said eye-wires and is graduated or tapered off to a normal or reduced thickness at the upper and lower sides of the said wires, substantially as set forth.

In testimony that I claim the foregoing I have hereunto set my hand this 24th day of February, 1892.

WM. E. STEVENS.

Witnesses:
CHARLES H. PELL,
OSCAR A. MICHEL.